US012611943B2

(12) United States Patent
Sprecher, III et al.

(10) Patent No.: US 12,611,943 B2
(45) Date of Patent: Apr. 28, 2026

(54) DISTRIBUTED POWER TRANSFER AND STORAGE SYSTEM FOR HIGH-SPEED DIRECT CURRENT CHARGING

(71) Applicant: OpenRoad Technologies Inc., Sunnyvale, CA (US)

(72) Inventors: Thomas W. Sprecher, III, Marietta, GA (US); Allan R. Taylor, Flushing, MI (US); Jonathan Larr, Gland Blanc, MI (US); Evan Kirchhoff, Cupertino, CA (US); Shawn Hickey, Santa Cruz, CA (US)

( * ) Notice: Subject to any disclaimer, the term of this patent is extended or adjusted under 35 U.S.C. 154(b) by 0 days.

(21) Appl. No.: 19/093,247

(22) Filed: Mar. 27, 2025

(65) Prior Publication Data

US 2025/0303886 A1     Oct. 2, 2025

Related U.S. Application Data

(60) Provisional application No. 63/570,782, filed on Mar. 27, 2024.

(51) Int. Cl.
*H02J 3/38* (2006.01)
*B60L 53/10* (2019.01)
(Continued)

(52) U.S. Cl.
CPC .............. *B60L 53/11* (2019.02); *B60L 53/51* (2019.02); *B60L 53/53* (2019.02); *B60L 55/00* (2019.02);
(Continued)

(58) Field of Classification Search
CPC .......... B60L 53/11; B60L 55/00; B60L 53/51; B60L 53/53; H02J 3/322; H02J 3/38; H02J 2300/24
(Continued)

(56) References Cited

U.S. PATENT DOCUMENTS

2011/0133684 A1* 6/2011 Eikeland ................. B60L 53/11
                                                320/101
2012/0074901 A1* 3/2012 Mohammed ............ B60L 53/11
                                                320/109
(Continued)

FOREIGN PATENT DOCUMENTS

JP       2023012313 A      1/2023
JP       2024021404 A      2/2024
(Continued)

OTHER PUBLICATIONS

International Search Report and Written Opinion for related International Patent Application PCT/US2025/021923 issued on Jul. 10, 2025, 10 pages.

*Primary Examiner* — Michael R. Fin
(74) *Attorney, Agent, or Firm* — Pillsbury Winthrop Shaw Pittman, LLP

(57) ABSTRACT
A distributed power transfer and storage system may receive first power from a first power source following a country specific common voltage. The distributed power transfer and storage system may store, in one or more energy storage media, the first power from the first power source. The distributed power transfer and storage system may provide, using the first power stored in the one or more energy storage media, direct current fast charging power to a battery that is included in an electric vehicle.

15 Claims, 8 Drawing Sheets

(51) Int. Cl.
    B60L 53/51          (2019.01)
    B60L 53/53          (2019.01)
    B60L 55/00          (2019.01)
    H02J 3/32           (2006.01)

(52) U.S. Cl.
    CPC ............... H02J 3/322 (2020.01); H02J 3/38
                      (2013.01); *H02J 2300/24* (2020.01)

(58) Field of Classification Search
    USPC ......................................................... 307/23
    See application file for complete search history.

(56)                    References Cited

U.S. PATENT DOCUMENTS

| | | | | |
|---|---|---|---|---|
| 2016/0176305 | A1* | 6/2016 | James | H02J 3/38 |
| | | | | 307/26 |
| 2017/0368949 | A1* | 12/2017 | Layden | B60L 53/11 |
| 2018/0264955 | A1* | 9/2018 | Gupta | G06Q 30/0283 |
| 2019/0372465 | A1* | 12/2019 | Xu | H02M 3/33573 |
| 2021/0102979 | A1 | 4/2021 | Inoue et al. | |

FOREIGN PATENT DOCUMENTS

| | | | |
|---|---|---|---|
| WO | 2019071359 | A1 | 4/2019 |
| WO | 2022170095 | A1 | 8/2022 |

* cited by examiner

500

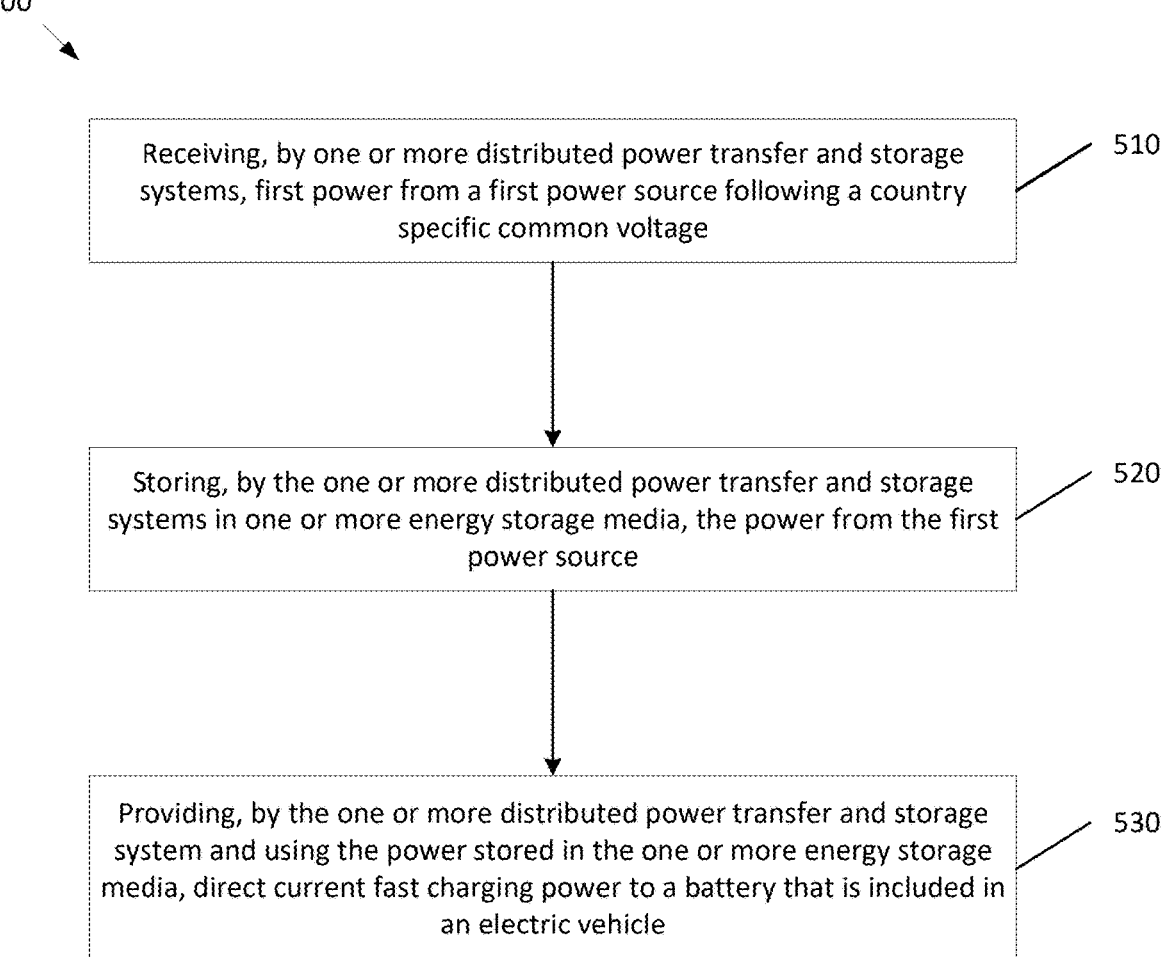

Receiving, by one or more distributed power transfer and storage systems, first power from a first power source following a country specific common voltage — 510

Storing, by the one or more distributed power transfer and storage systems in one or more energy storage media, the power from the first power source — 520

Providing, by the one or more distributed power transfer and storage system and using the power stored in the one or more energy storage media, direct current fast charging power to a battery that is included in an electric vehicle — 530

FIG. 5

DISTRIBUTED POWER TRANSFER AND STORAGE SYSTEM FOR HIGH-SPEED DIRECT CURRENT CHARGING

CROSS-REFERENCE TO RELATED APPLICATIONS

This patent application claims the benefit of priority of U.S. Provisional Patent Application No. 63/570,782, filed on Mar. 27, 2024, titled PORTABLE L3 BATTERY CHARGING ON L1 OR L2 ELECTRICAL INFRASTRUCTURE. The entire content of each afore-listed earlier filed application is hereby incorporated by reference in its entirety.

BACKGROUND

1. Field

The present disclosure generally relates to energy storage technology as well as electric vehicle charging technology, and in particular to systems and methods that deliver direct-current electric vehicle charging from home energy storage media at high voltage and power levels.

2. Description of Related Art

Home energy storage products employ battery systems to bank electrical power, originating from the electrical grid and/or local solar panels or other sources of generated energy. These systems may enable time-shifting of grid power consumption, off-grid storage of locally generated power, and/or backup sources of home power in case of electrical grid outage. They may provide these features via internally programmed logic, user-configured parameters, networked integration with internet-based price or demand signals, or other external sensors or inputs.

Electric vehicle (EV) charging products are classified according to charging speed, with lower-speed, alternating-current solutions designated "Level 1" or "Level 2", and higher-speed, direct-current solutions designated "Level 3". Because Level 3 (or "DC Fast Charging") solutions operate using direct current, they bypass the internal AC/DC converter of the electric vehicle, and deliver power directly into vehicle batteries via associated protocols. As such, they enable both faster charging rates and simplified electric vehicle designs, in which the vehicle's internal AC/DC converter could in principle be eliminated entirely.

SUMMARY

The following is a non-exhaustive listing of some aspects of the present techniques. These and other aspects are described in the following disclosure.

In some aspects, the techniques described herein relate to a method, including: receiving, by one or more distributed power transfer and storage systems, first power from a first power source following a country specific common voltage; storing, by the one or more distributed power transfer and storage systems in one or more energy storage media, the first power from the first power source; and providing, by the one or more distributed power transfer and storage systems and using the first power stored in the one or more energy storage media, direct current fast charging power to a battery that is included in an electric vehicle.

In some aspects, the techniques described herein relate to a system, including: a high-level controller; and a first distributed power transfer and storage system that includes:

a first low-level controller coupled to the high-level controller via a first communication connection; and one or more first storage/conversion modules that are coupled with the first low-level controller via a first communication bus and that is coupled to a power bus, wherein each of the one or more first storage/conversion modules includes: a first power converter; a first transformer coupled to the first power converter; and one or more first batteries coupled to the first transformer and the first power converter, wherein the first distributed power transfer and storage system is configured to: receive first power from a first power source following a country specific common voltage on the power bus; store, in the one or more first batteries in the one or more first storage/conversion modules, the first power from the first power source; and provide, using the first power stored in the one or more first batteries, direct current fast charging power as an output for a battery that is included in an electric vehicle.

In some aspects, the techniques described herein relate to a distributed power transfer and storage system, including: a means for storing power; and a means for converting stored direct current power in the means for storing the power to direct current fast charging power for charging an electric vehicle battery.

Some aspects include a tangible, non-transitory, machine-readable medium storing instructions that when executed by a data processing apparatus cause the data processing apparatus to perform operations including the above-mentioned processes.

Some aspects include a system, including: one or more processors; and a memory storing instructions that when executed by the processors because the processes to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements:

FIG. 5 illustrates a flow diagram illustrating an example method of distributed power transfer and storage for high-speed direct current charging.

Figure 1A:
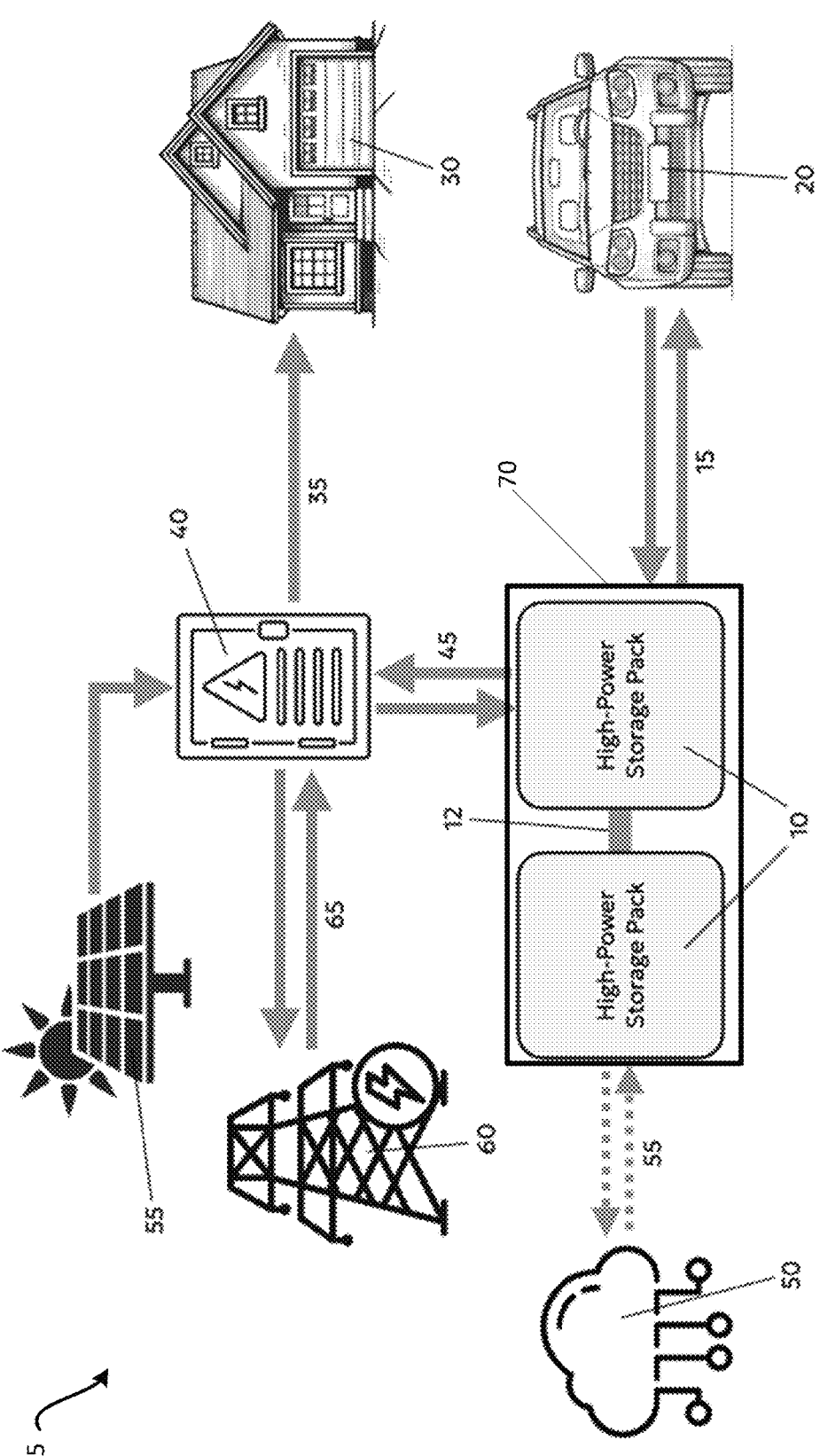
FIG. 1A illustrates a distributed power transfer and storage system integrated with a home electrical system, an electric vehicle, a power grid, and a network, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF EXAMPLE EMBODIMENTS

To mitigate the problems described herein, the inventors had to both invent solutions and, in some cases just as importantly, recognize problems overlooked (or not yet foreseen) by others in the fields of energy storage, energy transfer, and electric vehicles. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, conventional chargers in residential or commercial settings utilizing a country's common electrical standard for electric vehicle charging are limited to relatively slow speeds, charging speed is limited to the capacity of a single household circuit (typically 10 kW or below in speed). Furthermore, conventional home energy storage systems store power once and then hold it until a blackout occurs, so the physical asset and stored energy does not provide additional value in the meantime, whereas we introduce an additional use for this asset and its stored power; conventional systems cannot deliver DC fast charging because their power output is limited by the speed of ordinary household circuitry In various embodiments of the present disclosure, systems and methods are disclosed for home energy storage architecture that may employ the same batteries to selectively discharge stored power either at the relatively low power levels demanded by residential electrical backup systems or other electrical backup systems, using alternating current, or at the significantly higher power levels demanded by electric vehicle DC fast charging (e.g., Level 3 charging) or other electronic loads, using direct current. Importantly, the power delivery to the electric vehicle during charging sessions is not mediated by the home electrical panel or household circuitry, but instead employs a distributed power transfer and storage system connected directly to the electric vehicle via DC fast-charging hardware and software protocols, allowing for rapid DC power transfer, providing that the distributed power transfer and storage system is also architected so as to offer this additional manner of power delivery from its internal energy storage media.

The distributed power transfer and storage system of the present disclosure may employ a number of smaller elements acting in series or parallel that may be referred to herein as storage/conversion modules, (SCMs). In this example, the power transfer between each SCM and any power supplying or drawing system may be orchestrated by a low-level controller. This controller may be a subsystem that connects to one or more SCMs and directs the SCMs on their desired operation. In various embodiments, any number of controllers may be connected, providing a fully modular and highly granular power architecture. The controller may perform a supervisory role, monitoring the states, errors, and outputs of the attached SCMs. In various embodiments, the distributed power transfer and storage system may serve as its own distinct unit in a larger product architecture of multiple distributed power transfer and storage systems.

In various embodiments, the distributed power transfer and storage system may provide a first, foundational stage of product modularity. However, this may be expanded upon further by adding many accessories that can be connected to the distributed power transfer and storage systems, including but not limited to: AC-DC converters for AC rectification and DC-AC inversion, a vehicle charging cable for providing DC fast-charging capabilities, and a solar panel array or other external power generation source. These accessories may provide a bridge between a desired application and the energy storage and power delivery provided by the distributed power transfer and storage systems. The assembly of multiple distributed power transfer and storage systems and other accessories may be used to create a variety of user-facing products, devices, or solutions. Each resulting solution takes the functionality desired by the end-user and couples it with the SCM-based distributed power transfer and storage system to deliver a complete power delivery system.

These resulting distributed power transfer and storage systems can also be connected further in a variety of ways to provide benefits such as increased power capacity, increased output voltage, or reduced system stress. For example, two distributed power transfer and storage systems may be connected in series with one another to generate a higher resulting voltage for faster DC charging of electric vehicles than conventional DC charging systems. Similarly, two distributed power transfer and storage systems may also be connected in parallel to generate a higher level of AC output power. This modularity to unify distributed power transfer and storage systems into an even more configurable system provides a way for distributed power transfer and storage systems to function in a similar way to the internal SCMs, in the sense that multiple products can be utilized to provide a higher system output than would be otherwise possible.

As such, the systems and methods of the present disclosure provide a subdivided, modular system composed of multiple smaller distributed power transfer and storage systems or SCMs that allow for a more scalable, more customizable, and an overall safer energy storage and transfer system relative to traditional power architectures. This example provides a flexible way to ensure that the power and capacity needs of a system can be met across a range of use cases without requiring significant hardware redesign.

In various embodiments, the distributed power transfer and storage system provides a power electronics architecture analogous to a flexible "switchboard" for different types of power input and output, since, by design, some or all of the circuitry may be run in both forward and reverse directions. This allows for, but not limited to, the following use cases: (1) Charging the distributed power transfer and storage system from 120V or 240V AC wall power (or a combination of multiple AC wall power inputs); (2) Charging the distributed power transfer and storage system from a DC fast charger; (3) Charging the distributed power transfer and storage system from an EV's battery; (4) Charging an EV's battery in DC charging mode directly from the distributed power transfer and storage system; (5) charging an EV's battery in DC charging mode from 120V or 240V AC power ("pass through" of wall power plus AC/DC conversion via the distributed power transfer and storage system); (6) Charging an EV's battery in DC charging mode with a combination of 120V/240V AC power plus DC power from the distributed power transfer and storage system, in any desired ratio; (7) Charging the distributed power transfer and storage system, and a connected EV's battery, simultaneously, in any desired ratio, from external power input of any kind; (8) Sending power back into the grid from the distributed power transfer and storage system; (9) Powering a home or a local load from the distributed power transfer and storage system; (10) Sending power back into the grid from an EV's battery ("pass through" of DC power plus DC/AC conversion); (11) Powering connected appliances, or an entire home/business, from an EV's battery ("pass through" of DC power plus DC/AC conversion); (12) Delivering power back into the grid from a combination of EV battery power and power from the distributed power transfer and storage system; (13) Powering connected appliances, or an entire building, from a combination of EV battery power and power provided by the distributed power transfer and storage system; or (14) Transferring power from one EV to another EV, using the distributed power transfer and storage system as an intermediate controlling device and "pass-through" for electricity. While all of these features may not be exposed in all embodiment configurations, they are all foreseeable in potential embodiments. Some of these scenarios are also made significantly more practical by the fact that the electronics of the distributed power transfer and storage system is specifically architected for high-power delivery from a miniaturized form factor.

In various embodiments the distributed power transfer and storage system may include a software platform that may remotely aggregate multiple storage units into a coordinated "virtual power plant" and/or "virtual battery storage". This anticipates "Demand Response," which includes programmatically halting the charging of the storage units, or the attached electric vehicle or other energy storage media, at times of peak grid load, which may receive financial compensation from power utilities. The software platform may include Negative Energy Pricing, which includes programmatically waiting to charge the battery of the battery charger or the attached electric vehicle until moments in which local wholesale energy pricing is negative, and then being paid by providers to store this excess production of energy. Because the lowest possible latency of response time may be beneficial, the software platform may include AI (in the form of machine learning and/or large language models) to predict these favourable intervals before they occur, using signals including, but not limited to, the following: public or private APIs exposed by governments, power producers, or power distributors; price signals for electricity, such as the spot power market; automated scraping of web pages or electronic receipts; current or predicted weather or climate data; internal battery charger platform usage data; or historical data archives for all of the above. Also, because verifiable unit location is required for these applications, the hardware may include a GPS antenna for real-time location updates. In addition, the software platform may automatically optimize each user's charging costs, in cases where "time of use" power pricing is available. This optimization is self-configured, and may balance multiple factors such as cost and user convenience, based on signals including, but not limited to, a current GPS location of the device, a set of potential power providers and their rate plans available at that location; a user's power bills (for example, scanned into the platform via photography or optical character recognition); or a household's historical charging or driving patterns on an aggregate or a per-vehicle basis.

In various embodiments of the present disclosure, all of the above power conversion, combination, augmentation, and distribution functionality ("Power Electronics") may be directed and controlled remotely. This may allow integration with both remote user commands (via mobile or web apps) and autonomous software platform logic or algorithms. Other features enabled by this connectivity include hardware compliance with "submetering" requirements (e.g., CPUC R.18-12-006, 2022 (herein incorporated by reference in its entirety)) for monitoring and reporting of power consumption in EV charging, allowing charging energy to be billed separately by power utilities under more favourable rates; software compliance with demand-response APIs (e.g., Open Automated Demand Response, or OpenADR); or software compliance with electric vehicle charger management APIs (e.g., Open Charge Point Protocol, or OCPP).

In various embodiments of the present disclosure, the wireless connectivity may include 2G, 3G, 4G, 5G or 6G cellular networks, including multiple cellular protocols (LTE Cat M, LTE Cat 1, etc.), WiFi networking (WiFi 5, 6, 7, etc.), IoT protocols (Bluetooth/BLE, MQTT, CoAP, LoRaWAN, LwM2M, WebSocket, 6LoPAN, LPWAN, RFID), smart home device networking standards (e.g., Zigbee, Matter), wired connectivity to a computing device (e.g., via serial protocols), satellite connectivity, or other connectivity systems, protocols, or standards that would be apparent to one of skill in the art in possession of the present disclosure.

In various embodiments of the present disclosure, all of the above power conversion, combination, augmentation, and distribution functionality may be directed and controlled by end users via mobile or web applications. For consumer users, this may include functions such as setting the timing of the electric vehicle charging, the charging of the home energy storage system, or the rate of power delivery to the electric vehicle, including the managing of the competing charging demands of multiple electric vehicles. Users may also control and manage the trade-off between the lowest charging costs and other convenience factors, or may choose to "override" the automated optimization features of the software platform/controller of the distributed power transfer and storage system.

In various embodiments of the present disclosure, batteries included in the SCMs may employ alternative battery chemistries, including, but not limited to: Li-ion, LiPo, Li—S, Solid-state, Lead-acid, NiCd, NiMH, NiZn, Na-ion, Alkaline, Magnesium-ion, or Silver-zinc. Alternative embodiments may employ different types of MOSFETs, including but not limited to: GaN, SiC, Si, or IGBT. In addition, some embodiments may include different electrical and/or control topologies within SCMs, such as individually self-governed SCMs rather than SCMs grouped with an external controller, or SCMs targeting a lower net voltage that is then converted to a higher voltage with a single external converter rather than multiple embedded converters. In some embodiments, the connection between high-power storage elements may employ alternating current rather than direct current. In some embodiments, a configurable full bridge may be employed to have the SCMs switch dynamically between output voltages, such as between the two common electric vehicle charging standards of 400V and 800V. In some embodiments, a non-isolated topology could be employed that excludes isolation between the batteries and the power output.

Figure 1B:
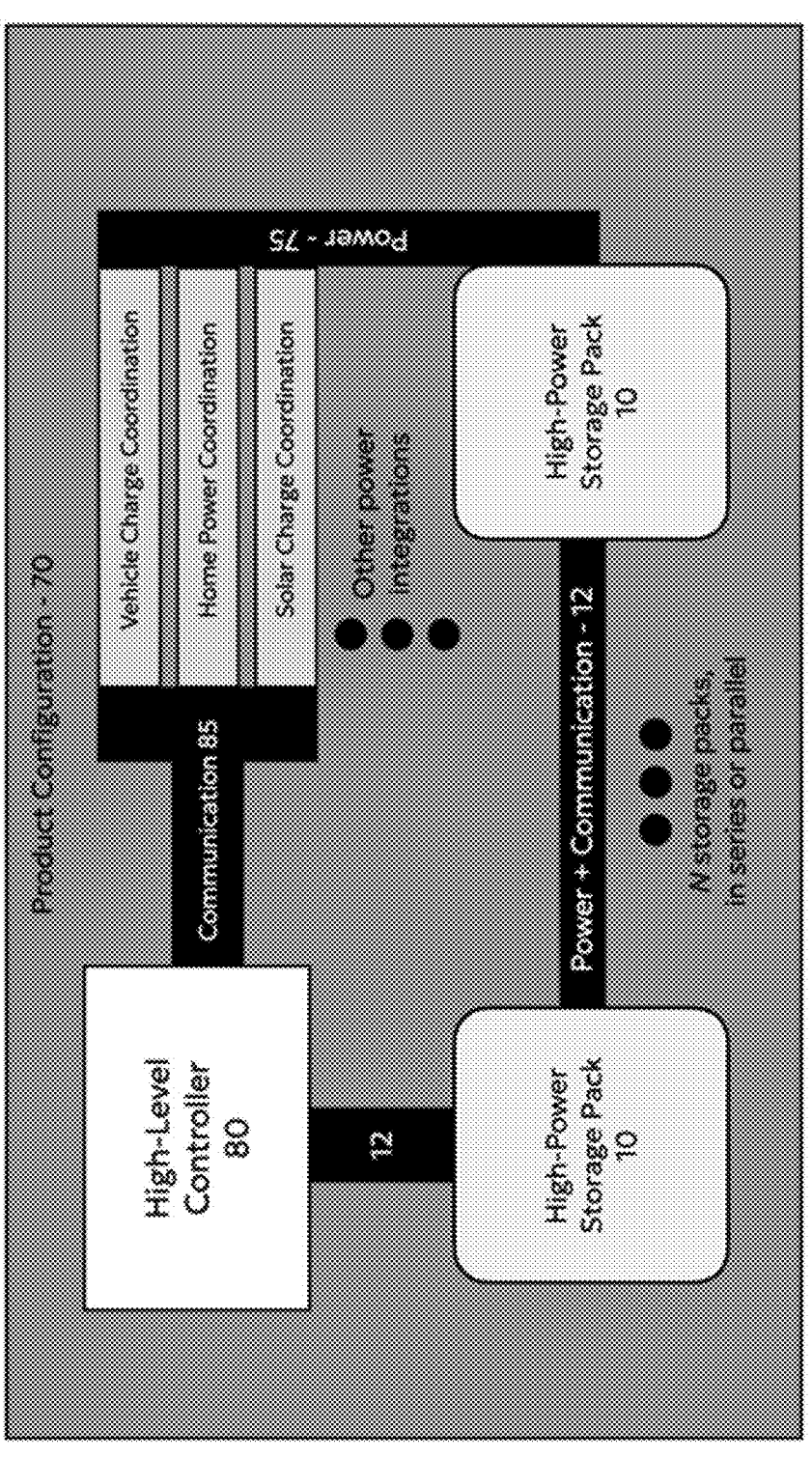
FIG. 1B illustrates a high-level controller communicating with one or more of the distributed power transfer and storage systems and various power sources and power consumers, according to various embodiments of the present disclosure.

FIGS. 1A and 1B illustrates an embodiment of a high-level power supply and distribution architecture 5 including a distributed power transfer and storage system 10. The distributed power transfer and storage system 10 of FIGS. 1A and 1B provides an example embodiment of a combined home energy storage and DC fast-charging system. The power supply and distribution architecture 5 may include one or more distributed power transfer and storage systems 10 (e.g., two distributed power transfer and storage systems are illustrated in FIGS. 1A and 1B) that are used to store power from either a power grid 60 or a local energy source 55 such as solar panels, a gas generator, a wind turbine, or other local energy sources that would be apparent to one of skill in the art in possession of the present disclosure, with power delivered to the distributed power transfer and storage system 10 via home outlets or circuits 45 that may provide 120V, 240V, or other country specific common voltages/currents that would be apparent to one of skill in the art of the present disclosure. This stored power may optionally be delivered back to an electrical load, such as a home 30 at typical household voltages 35 via a home electrical panel 40 or associated electrical switching elements. This stored power may also optionally be used to provide DC fast charging to an electric vehicle 20 or other DC load at a high voltage (e.g., 400V-800V or other voltage/currents that are used to achieve DC fast charging that would be apparent to one of skill in the art) that is demanded by the vehicle or the particular load utilizing or storing DC power, via a direct connection 15 between the distributed power transfer and storage system 10 and the vehicle 20, without mediation by the home electrical panel or intervening household circuitry. Multiple the distributed power transfer and storage system 10 may be connected, either in series or in parallel, via electrical and communications lines 12 to provide additively higher voltage and/or power output and/or energy storage capacity. In various embodiments of the present disclosure, if the high-power storage packs are depleted, or optionally at any time, a "pass-through" feature may be engaged to deliver household power from connected home circuits through the storage packs to the electric vehicle, or optionally any combination of household power sources and stored energy within the storage packs may be combined to deliver the resulting total power to the electric vehicle as direct current or DC fast charging.

Figure 2:
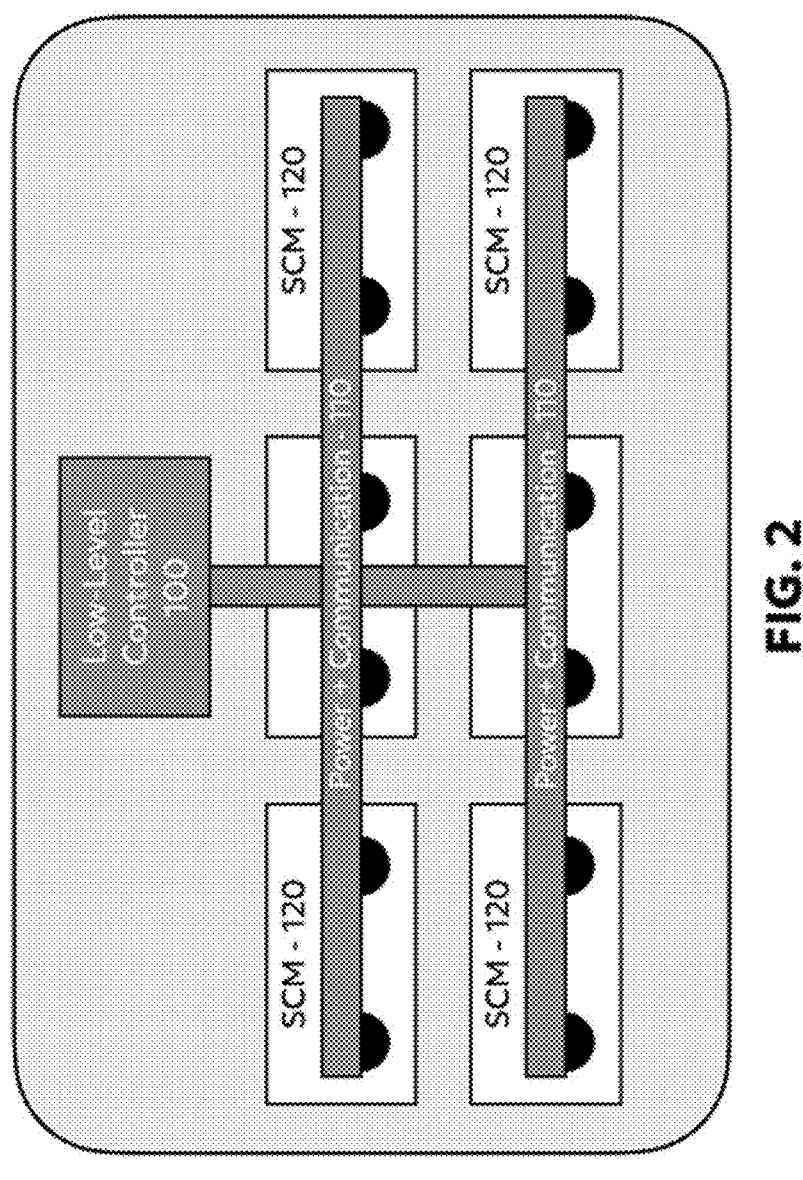
FIG. 2 illustrates a block diagram of the distributed power transfer and storage system of FIGS. 1A and 1B, in accordance with some embodiments of the present disclosure.

Individual distributed power transfer and storage systems 10 may be formulated in different sizes or different levels of energy storage capacity, including portable form factors that may be used in isolation to charge electric vehicles away from the home and disconnected from the electrical grid. Furthermore, in various embodiments of the present disclosure, in addition to transferring stored energy to the electric vehicle 20, the distributed power transfer and storage system 10 and their two-way electrical connection 15 to the electric vehicle 20 may be used to transfer power outwardly from the electric vehicle 20 back to the distributed power transfer and storage system 10, or from the electric vehicle outwardly back to the power grid 60 via two-way electrical connection 65, allowing for integration with electrical utility features such as vehicle-to-grid (V2G) power transfer, utility demand-response programs, or distributed energy storage (DER) and virtual power plant (VPP) solutions. These solutions may be mediated by internal logic, optional configuration by users, or external internet platforms or signals 50 via network connectivity 55. These underlying components, along with a high-level controller 80, may be assembled into a particular product configuration 70. This could include a power bus 75 to exchange power between external devices that supply or demand power, and a communications bus 85 to coordinate this power exchange between the product and various external devices. For example, the high-level controller 80 may communicate with an electric vehicle's battery management system (BMS) during the charging of the electric vehicles battery according to ISO 15118 (herein incorporated by reference in its entirety), which defines the communication protocol between the electric vehicle and a conventional charging station, enabling features like "plug and charge" and secure, efficient charging FIG. 2 illustrates a block diagram of the distributed power transfer and storage system 10. The distributed power transfer and storage system 10 may include a chassis 102 such as a product enclosure may be composed of metal or plastic. The chassis 102 may be in a portable ("luggage style") configurations that may feature an extendable handle or rolling wheels, in the manner of carry-on luggage. In various embodiments, the power electronics and battery components may be in a single chassis 102, or separate chassis.

In various embodiments the chassis 102 may house a low-level controller 100 such as, for example, a microprocessor or a microcontroller that synchronizes and commands a set of one or more "Storage/Conversion Modules" (SCMs) 120, connected via power lines and internal communication channels 110. The low-level controller 100 provides both operational features, including but not limited to the desired power output of each SCM 120 to deliver the total power requested by the load such as the electric vehicle 20 of FIGS. 1A and 1B, and safety and monitoring features, including but not limited to balancing the output power among the SCMs 120 or other the distributed power transfer and storage systems 10. In various embodiments of the present disclosure, the SCMs 120 may be wired in any configuration desired, with any number in parallel on the same bus included in the power lines and internal communication channels 110 to produce higher total power, or in series to produce higher total voltage, or in any combination of parallel and series, resulting in greater flexibility for the distributed power transfer and storage system 10.

Figure 3:
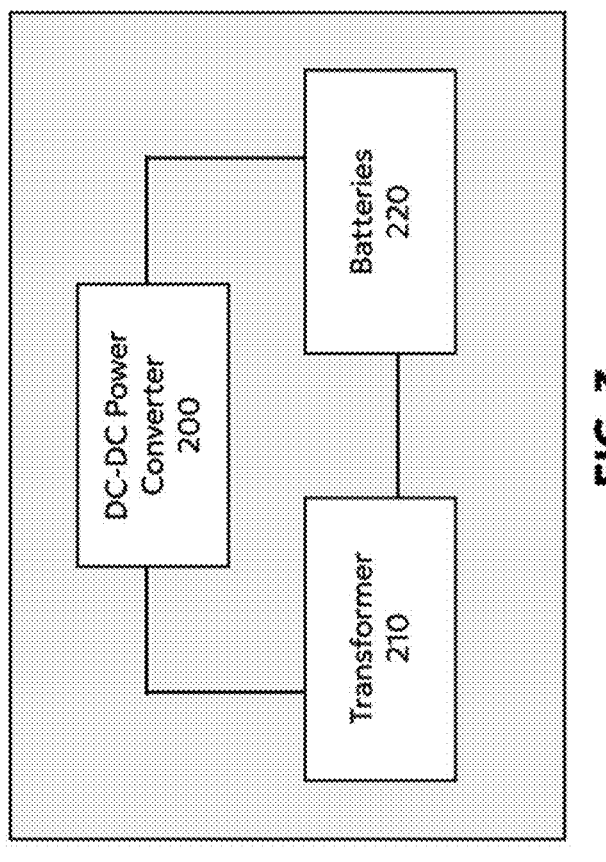
FIG. 3 illustrates a high-level block diagram of a storage/conversion module (SCM) included in the distributed power transfer and storage system of FIG. 2, in accordance with some embodiments of the present disclosure.

FIG. 3 illustrates a block diagram of components of an SCM 120, according to various embodiments of the present disclosure. The SCM 120 may include a DC-DC power converter 200, a transformer 210 and an energy storage media such as batteries 220. Each SCM 120 is a fully capable isolated power converter designed to take a lower voltage/low power and generate higher voltage/high power, independent of other SCMs 120 included in the distributed power transfer and storage system 10. This lower to higher voltage conversion distributed across multiple SCMs 120 in concert provides a safer product assembly process and a more distributed thermal load by dispersing the encountered power loss over a greater area; allows for easy paralleling of SCMs 120 to generate higher output power and increased capacity; reduces aggregate product cost by employing inexpensive, lower-power components within individual SCMs 120; and also offers a high degree of flexibility in external product form factors, since a product may be scaled up or down by employing different numbers of SCMs 120, which may include the targeting of portable product formats.

Figure 4A:
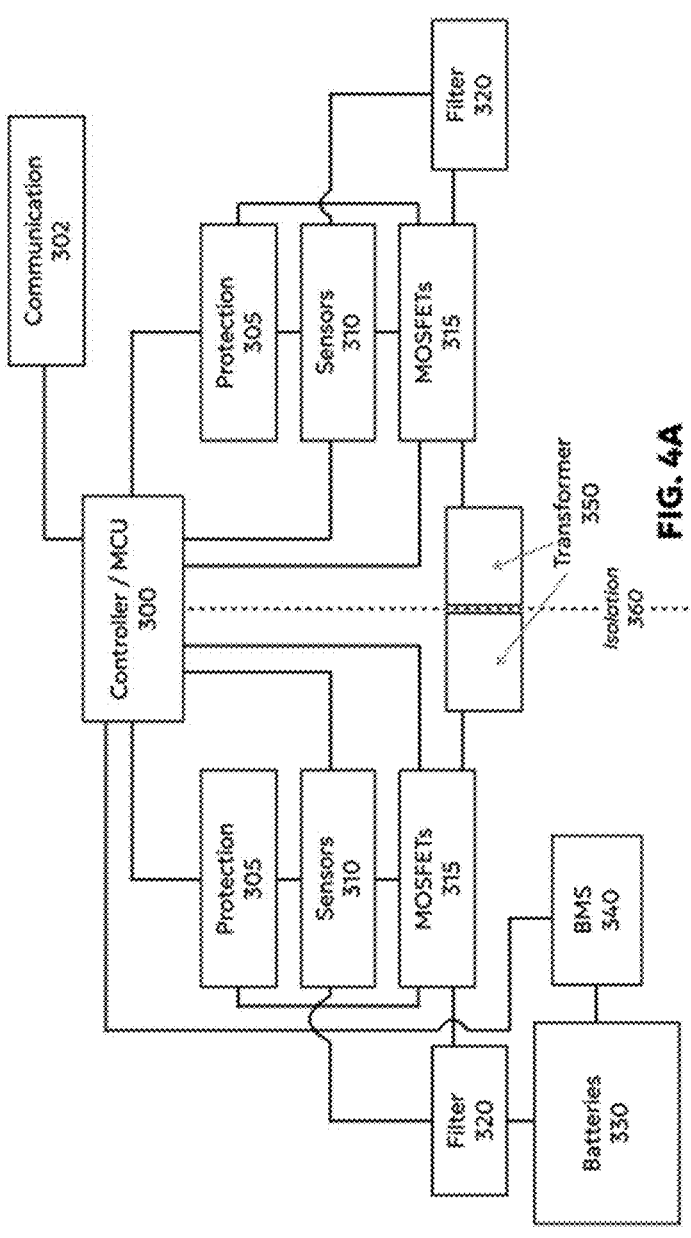
FIG. 4A illustrates a block diagram of a detailed internal architecture for the SCM of FIG. 3, in accordance with some embodiments of the present disclosure.
Figure 4B:
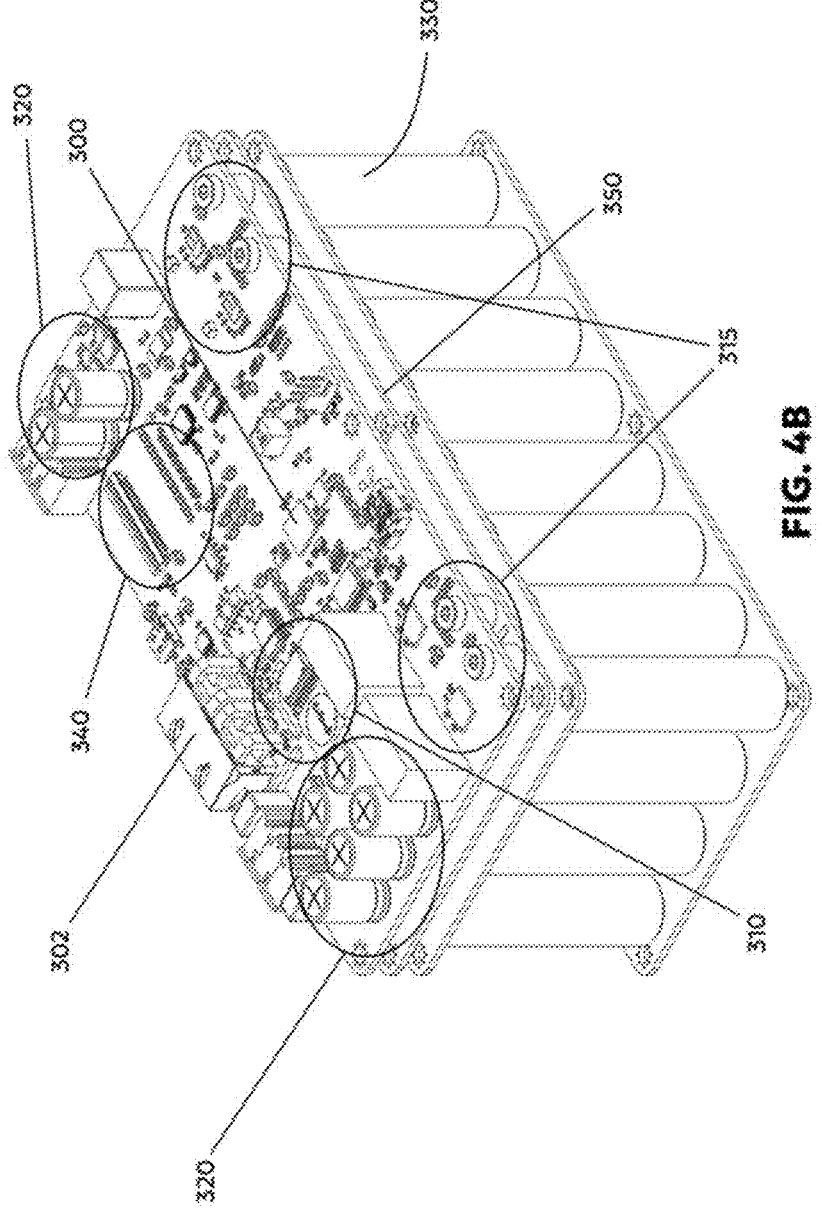
FIG. 4B illustrates a perspective view of an SCM of FIG. 3, in accordance with some embodiments of the present disclosure.

FIGS. 4A and 4B illustrate a more detailed block diagram and a perspective view, respectively, of an embodiment of the components of the SCM 120 of FIG. 3. An example design of the SCM 120 and its DC-DC power converter 200 may include on one side of an isolation barrier 360, any number (N) of series batteries 330 (or other power storage media), or any number (M) of parallel batteries 330 (or other power storage media), regulated by a battery management system (BMS) 340, which may provide long term energy storage. The batteries 330 may feed power into a battery-side filter 320, which provides power conditioning between the MOSFETs 315 and the batteries 330. Power conditioning is the process of improving the quality of electrical power to make it compatible with sensitive equipment by addressing issues like voltage fluctuations, noise, and surges, ensuring proper and reliable operation. The stored power travels from the batteries 330 through protection circuitry 305. Protection circuitry 305 prevents conditions such as over and under current, over voltage, over temperature, circuit failure, microcontroller failure, and provides MOSFET 315 fail safe control.

The conditioned power is then provided to the MOSFET full bridge 315, which takes the direct current from the battery 330 and drives the transformer 350 with alternating current, with the transformer 350 providing isolation between both sides of the circuit, while transforming the lower battery voltage to the high voltage demanded by electric vehicle charging applications or other electronic loads that may be capable of demanding DC fast charging power. The higher voltage alternating current is rectified back to direct current by the high voltage MOSFET full bridge 315 before power conditioning by the filter 320 and finally output to the attached load as DC fast charging power. Sensors 310 may allow the microcontroller 300 to read the operating parameters of the system. Protection circuitry 305 may exists for safety in the event of hardware failure states. The microcontroller 300 may direct the components of the SCM 120 based on the sensor 310 or communication 302 inputs, using embedded software. Communication signals for the communication inputs 302 may be provided by the low-level controller 100 of the surrounding distributed power transfer and storage system 10. In this embodiment, the flow of power through each SCM 120 is bidirectional, providing a way to discharge and charge the batteries 330 using the same circuit, but a unidirectional power converter with a separate battery charging circuit is also contemplated. In some embodiments, a non-isolated converter architecture may be used for power transfer between the batteries 330 and the DC-DC power converter 200. While a specific example of an SCM is illustrated, one of skill in the art in possession of the present disclosure will recognize that other components and configurations may be considered.

FIG. 5 shows a flow chart illustrating an example method 500 of distributed power transfer and storage for high-speed direct current charging. In various embodiments, at block 510, one or more distributed power transfer and storage system 10 may receive first power from a first power source. In some embodiments the first power source may include a home, residential, or small business or other one phase power distribution source that includes country specific voltages and currents. As an example, the distributed power transfer and storage system 10 may plug into a wall outlet of a home. As such, the first power may be alternating current power. However, in other embodiments, the power source may be provided by another energy storage system or power source such as, for example, a battery from an electric vehicle, solar panels, separate home energy storage system, or other sources of DC or AC power. As such, the power may be limited to relatively low voltages (e.g., less than 250 V) and current (e.g., less than 20 amps).

The method 500 may proceed to block 520 where the first power from the first power source is stored in one or more energy storage media. In an embodiment, at block 520, the one or more distributed power transfer and storage systems 10 may store the power in respective one or more batteries 220 of the one or more SCMs 120 included in each of the one or more distributed power transfer and storage systems 10. An AC-DC power converter may convert any of the AC power received and store as DC power in the batteries 220. As discussed above, the power may be distributed across any number of distributed power transfer and storage systems 10 that may include any number of SCMs 120.

The method 500 may proceed to block 530 where the first power stored in the one or more energy storage media, provides direct current fast charging power to a battery that is included in an electric vehicle. In an embodiment, at block 530, the low-level controller 100 of a distributed power transfer and storage system 10 may instruct the one or more SCMs 120 to convert stored power into a power that satisfies a direct current fast charging protocol. As such, the direct current power level may be higher than the power level than the source of power that charged the batteries 230 of the SCMs 120. Each SCM 120 may use the DC-DC power converter 200 and transformer 210 to convert the stored power to a direct current fast charging power as described above in reference to at least FIGS. 4A and 4B. The combined power of each SCM 120 and each distributed power transfer and storage systems 10 may be output to the power demand device via a power bus and power connection.

While an example method 500 is described, other functionality and steps described above with respect to the distributed power transfer and storage systems may be contemplated.

Figure 6:
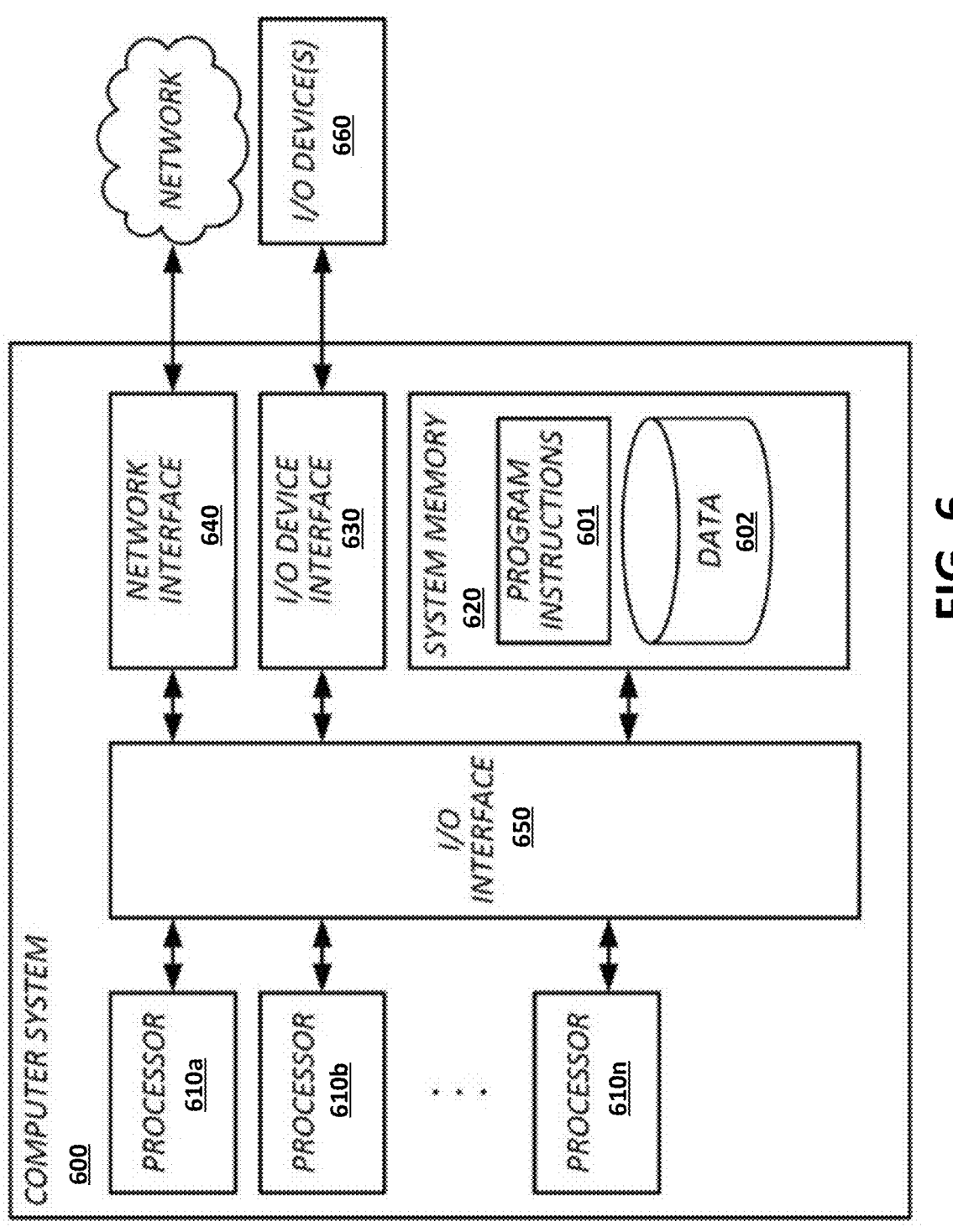
FIG. 6 illustrates an example computing device by which the present techniques may be implemented in some embodiments.

FIG. 6 is a diagram that illustrates an exemplary computing system 600 in accordance with embodiments of the present technique. Various portions of systems and methods described herein, may include or be executed on one or more computing systems similar to computing system 600. Further, processes and modules described herein may be executed by one or more processing systems similar to that of computing system 600.

Computing system 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 600 may include a plurality of computing devices (e.g., distributed computing systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computing system, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 601 or data 602. Program instructions 601 may be executable by a processor (e.g., one or more of processors 610a-610n) to implement one or more embodiments of the present techniques. Instructions 601 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 650 may be configured to coordinate I/O traffic between processors 610a-1010n, system memory 620, network interface 640, I/O devices 660, or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600 or multiple computing systems 600 configured to host different portions or instances of embodiments. Multiple computing systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 600 may be transmitted to computing system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on"

another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

Embodiment 1. A method, comprising: receiving, by one or more distributed power transfer and storage systems, first power from a first power source following a country specific common voltage; storing, by the one or more distributed power transfer and storage systems in one or more energy storage media, the first power from the first power source; and providing, by the one or more distributed power transfer and storage systems and using the first power stored in the one or more energy storage media, direct current fast charging power to a battery that is included in an electric vehicle.

Embodiment 2. The method of embodiment 1, further comprising: receiving, by a high-level controller coupled to the one or more distributed power transfer and storage systems, charging instructions from the electric vehicle, wherein the providing the direct current fast charging power to the battery is based on the charging instructions.

Embodiment 3. The method of embodiment 1, further comprising: receiving, by a high-level controller coupled to the one or more distributed power transfer and storage systems, power instructions to provide power to the first power source, wherein the first power source is an alternating current power source; converting, by the one or more distributed power transfer and storage systems, the power stored in the one or more energy storage media from direct current power to alternating current power; and providing, by the one or more distributed power transfer and storage systems, the alternating current power to the first power source.

Embodiment 4. The method of embodiment 3, wherein at least a portion of the direct current power is drawn from the battery included in the electric vehicle.

Embodiment 5. The method of embodiment 3, wherein a portion of the direct current power is drawn from a second power source from which the one or more distributed power transfer and storage systems is obtain power.

Embodiment 6. The method of embodiment 5, wherein the second power source is a solar panel system.

Embodiment 7. The method of embodiment 1, wherein each of the one or more distributed power transfer and storage systems comprises: a low-level controller; and one or more storage/conversion modules coupled with the low-level controller via a communication bus and a power bus, wherein each of the one or more storage/conversion modules includes: a power converter; a transformer coupled to the power converter; and at least a portion of the one or more energy storage media, wherein the one or more storage/conversion modules are each configured to provide at least a portion of the direct current fast charging power to the power bus.

Embodiment 8. The method of embodiment 1, further comprising: determining, by the one or more distributed power transfer and storage systems, that power stored on the one or more energy storage media has reached a depletion threshold; and directly providing, by the one or more distributed power transfer and storage systems, the first power to the battery included in the electric vehicle as direct current power that is less than the direct current fast charging power.

Embodiment 9. The method of embodiment 8, wherein the first power is alternating current power and the method further comprises: converting, by the one or more distributed power transfer and storage systems, the first power to the direct current power.

Embodiment 10. The method of embodiment 1, wherein at least a portion of the direct current fast charging power includes the first power from the first power source.

Embodiment 11. A system, comprising: a high-level controller; and a first distributed power transfer and storage system that includes: a first low-level controller coupled to the high-level controller via a first communication connection; and one or more first storage/conversion modules that are coupled with the first low-level controller via a first communication bus and that is coupled to a power bus, wherein each of the one or more first storage/conversion modules includes: a first power converter; a first transformer coupled to the first power converter; and one or more first batteries coupled to the first transformer and the first power converter, wherein the first distributed power transfer and storage system is configured to: receive first power from a first power source following a country specific common voltage on the power bus; store, in the one or more first batteries in the one or more first storage/conversion modules, the first power from the first power source; and provide, using the first power stored in the one or more first batteries, direct current fast charging power as an output for a battery that is included in an electric vehicle.

Embodiment 12. The system of embodiment 11, further comprising: a second distributed power transfer and storage system that is coupled to the first distributed power transfer and storage system via the power bus and that includes: a second low-level controller coupled to the high-level controller via a second communication connection; and one or more second storage/conversion modules that are coupled with the second low-level controller via a second communication bus and that is coupled to the power bus, wherein each of the one or more second storage/conversion modules includes: a second power converter; a second transformer coupled to the second power converter; and one or more second batteries coupled to the second transformer and the second power converter, wherein the first distributed power transfer and storage system is configured to: receive second power from the first power source following the country specific common voltage on the power bus; store in the one or more second batteries in the one or more second storage/conversion modules, the second power from the first power source; and provide, using the second power stored in the one or more second batteries, a portion of the direct current fast charging power to the battery that is included in the electric vehicle.

Embodiment 13. The system of embodiment 12, wherein the first distributed power transfer and storage system and the second distributed power transfer and storage system are coupled together via the power bus in series or parallel.

Embodiment 14. The system of embodiment 11, wherein the high-level controller is configured to: receive charging instructions from the electric vehicle; and provide, to the first low-level controller, the charging instructions, wherein the charging instructions cause the first low-level controller to instruct each of the one or more first storage/conversion modules to output a direct current power used for the direct current fast charging power indicated by the charging instructions.

Embodiment 15. The system of embodiment 11, wherein the high-level controller is configured to: receive power instructions to provide power to the first power source, wherein the first power source is an alternating current power source; and provide, to the first low-level controller, the power instructions, wherein the power instructions cause the low-level controller to instruct each of the one or more first storage/conversion modules to: convert the first power stored in the one or more first batteries from direct current power to alternating current power; and provide the alternating current power to the first power source acting as a power demand.

Embodiment 16. The system of embodiment 15, wherein the first distributed power transfer and storage system is configured to: draw a portion of the direct current power from a second power source from which the first distributed power transfer and storage system obtains power.

Embodiment 17. The system of embodiment 16, wherein the second power source is at least one of a solar panel or the battery of the electric vehicle.

Embodiment 18. The system of embodiment 11, wherein the first distributed power transfer and storage system is configured to: determine that power stored on the one or more first batteries has reached a depletion threshold; and directly provide the first power to the battery include in the electric vehicle as direct current power that is less than the direct current fast charging power.

Embodiment 19. The system of embodiment 11, wherein each of the one or more first storage/conversion modules comprises: a means for storing power; and a means for converting stored direct current power in the means for storing the power to a higher direct current power output.

Embodiment 20. A distributed power transfer and storage system, comprising: a means for storing power; and a means for converting stored direct current power in the means for storing the power to direct current fast charging power for charging an electric vehicle battery.

What is claimed is:

1. A method, comprising:
receiving, by one or more distributed power transfer and storage systems, first power from a first power source following a country specific common voltage;
storing, by the one or more distributed power transfer and storage systems in one or more energy storage media, the first power from the first power source;
receiving, by a high-level controller, charging instructions associated with an electric vehicle;
issuing, by the high-level controller, one or more control instructions to a low-level controller associated with the one or more distributed power transfer and storage systems;
transmitting, by the low-level controller, one or more commands to a first plurality of modular storage/conversion units over a communication bus,
wherein each of the one or more distributed power transfer and storage systems comprises a plurality of modular storage/conversion units, and each storage/conversion unit includes:
a DC-DC power converter,
a transformer,
at least a portion of the one or more energy storage media, and
a local controller configured to control operation of the DC-DC power converter and monitor the one or more energy storage media,
wherein each local controller is further configured to determine an output contribution to a power bus based on sensor data and received commands, and
wherein each storage/conversion unit is individually configured to convert power stored in its respective energy storage media to direct current fast charging power and to output the direct current fast charging power independently of other storage/conversion units and in parallel with other storage/conversion units; and providing, by the one or more distributed power transfer and storage systems and using the first power stored in the one or more energy storage media, the direct current fast charging power to a battery that is included in the electric vehicle, wherein the direct current fast charging power is delivered via a direct connection between the one or more distributed power transfer and storage systems and the electric vehicle while the one or more distributed power transfer and storage systems are disconnected from any external power source including the first power source.

2. The method of claim 1, further comprising:

receiving, by the high-level controller coupled to the one or more distributed power transfer and storage systems, power instructions to provide power to the first power source, wherein the first power source is an alternating current power source;

converting, by the one or more distributed power transfer and storage systems, the power stored in the one or more energy storage media from direct current power to alternating current power; and providing, by the one or more distributed power transfer and storage systems, the alternating current power to the first power source.

3. The method of claim 2, wherein at least a portion of the direct current power is drawn from the battery included in the electric vehicle.

4. The method of claim 1, further comprising:

determining, by the one or more distributed power transfer and storage systems, that power stored on the one or more energy storage media has reached a depletion threshold;

determining, by the one or more distributed power transfer and storage systems, that a power source has been reconnected to the one or more distributed power transfer and storage systems; and directly providing, by the one or more distributed power transfer and storage systems and from the power source, power to the battery included in the electric vehicle as direct current power that is less than the direct current fast charging power.

5. The method of claim 4, wherein the first power is alternating current power and the method further comprises:

converting, by the one or more distributed power transfer and storage systems, the power to the direct current power.

6. A system, comprising:

a high-level controller; and a first distributed power transfer and storage system that includes:

a first low-level controller coupled to the high-level controller via a first communication connection; and one or more first storage/conversion modules that are coupled with the first low-level controller via a first communication bus and that is coupled to a power bus, wherein each of the one or more first storage/conversion modules includes:

a first power converter;

a first transformer coupled to the first power converter;

one or more first batteries coupled to the first transformer and the first power converter; and a first local controller configured to control, based on sensor data and communications from the first low-level controller, operation of the first power converter and monitor the one or more first batteries, wherein each storage/conversion module is individually configured to convert power from its respective one or more first batteries to direct current fast charging power and to output the direct current fast charging power to the power bus in parallel with other storage/conversion modules, and wherein the first distributed power transfer and storage system is configured to:

receive first power from a first power source following a country specific common voltage on the power bus;

store, in the one or more first batteries in the one or more first storage/conversion modules, the first power from the first power source; and provide, using the first power stored in the one or more first batteries, direct current fast charging power as an output for a battery that is included in an electric vehicle, wherein the direct current fast charging power is delivered via a direct connection between the first distributed power transfer and storage system and the electric vehicle while the first distributed power transfer and storage system is disconnected from any external power source including the first power source.

7. The system of claim 6, further comprising:

a second distributed power transfer and storage system that is coupled to the first distributed power transfer and storage system via the power bus and that includes:

a second low-level controller coupled to the high-level controller via a second communication connection; and one or more second storage/conversion modules that are coupled with the second low-level controller via a second communication bus and that is coupled to the power bus, wherein each of the one or more second storage/conversion modules includes:

a second power converter;

a second transformer coupled to the second power converter;

one or more second batteries coupled to the second transformer and the second power converter; and a second local controller configured to control, based on sensor data and communications from the second low-level controller, operation of the second power converter and monitor the one or more second batteries, wherein each storage/conversion module is individually configured to convert power from its respective one or more second batteries to direct current fast charging power and to output the direct current fast charging power to the power bus in parallel with other storage/conversion modules, wherein the second distributed power transfer and storage system is configured to:

receive second power from the first power source following the country specific common voltage on the power bus;

store in the one or more second batteries in the one or more second storage/conversion modules, the second power from the first power source; and provide, using the second power stored in the one or more second batteries, a portion of the direct current fast charging power, via the power bus, to the battery that is included in the electric vehicle.

8. The system of claim 7, wherein the first distributed power transfer and storage system and the second distributed power transfer and storage system are coupled together via the power bus in series or parallel.

9. The system of claim 6, wherein the high-level controller is configured to:

receive charging instructions from the electric vehicle; and provide, to the first low-level controller, the charging instructions, wherein the charging instructions cause the first low-level controller to instruct each of the one or more first storage/conversion modules to output a direct current power used for the direct current fast charging power indicated by the charging instructions.

10. The system of claim 6, wherein the high-level controller is configured to:

receive power instructions to provide power to the first power source, wherein the first power source is an alternating current power source; and provide, to the first low-level controller, the power instructions, wherein the power instructions cause the first low-level controller to instruct each of the one or more first storage/conversion modules to:

convert the first power stored in the one or more first batteries from direct current power to alternating current power; and provide the alternating current power to the first power source acting as a power demand.

11. The system of claim 10, wherein the first distributed power transfer and storage system is configured to:

draw a portion of the direct current power from a second power source from which the first distributed power transfer and storage system obtains power.

12. The system of claim 11, wherein the second power source is at least one of a solar panel or the battery of the electric vehicle.

13. The system of claim 6, wherein the first distributed power transfer and storage system is configured to:

determine that power stored on the one or more first batteries has reached a depletion threshold; and directly provide the first power to the battery include in the electric vehicle as direct current power that is less than the direct current fast charging power.

14. The method of claim 1, wherein the first power source includes a single-phase power source.

15. A distributed power transfer and storage system comprising:

a first low-level controller coupled to a high-level controller via a first communication connection; and one or more first storage/conversion modules that are coupled with the first low-level controller via a first communication bus and that is coupled to a power bus, wherein each of the one or more first storage/conversion modules includes:

a first power converter;

a first transformer coupled to the first power converter;

one or more first batteries coupled to the first transformer and the first power converter; and a first local controller configured to control, based on sensor data and communications from the first low-level controller, operation of the first power converter and monitor the one or more first batteries, wherein each storage/conversion module is individually configured to convert power from its respective one or more first batteries to direct current fast charging power and to output the direct current fast charging power to the power bus in parallel with other storage/conversion modules, and wherein the distributed power transfer and storage system is configured to:

receive first power from a first power source following a country specific common voltage on the power bus;

store, in the one or more first batteries in the one or more first storage/conversion modules, the first power from the first power source; and provide, using the first power stored in the one or more first batteries and via the power bus, direct current fast charging power as an output for a battery that is included in an electric vehicle, wherein the direct current fast charging power is delivered via a connection between the distributed power transfer and storage system and the battery of the electric vehicle while the distributed power transfer and storage system is disconnected from any external power source including the first power source.

* * * * *